United States Patent
Narayanaswami et al.

(10) Patent No.: US 7,084,903 B2
(45) Date of Patent: Aug. 1, 2006

(54) IMAGE CAPTURING SYSTEM AND METHOD FOR AUTOMATICALLY WATERMARKING RECORDED PARAMETERS FOR PROVIDING DIGITAL IMAGE VERIFICATION

(75) Inventors: Chandrasekhar Narayanaswami, Wilton, CT (US); Edward Scott Kirkpatrick, Croton-On-Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 141 days.

(21) Appl. No.: 09/080,517

(22) Filed: May 18, 1998

(65) Prior Publication Data

US 2003/0011684 A1    Jan. 16, 2003

(51) Int. Cl.
    *H04N 9/04*    (2006.01)
    *H04N 5/76*    (2006.01)
(52) U.S. Cl. .............................. 348/207.99; 348/231.3
(58) Field of Classification Search ................ 348/232, 348/207; 382/100, 232
    See application file for complete search history.

(56) References Cited

U.S. PATENT DOCUMENTS

| 4,574,319 | A |   | 3/1986 | Konishi |
| 5,247,356 | A |   | 9/1993 | Ciampa |
| 5,335,072 | A | * | 8/1994 | Tanaka et al. ............. 348/232 |
| 5,499,294 | A | * | 3/1996 | Friedman .................... 380/10 |
| 5,506,644 | A |   | 4/1996 | Suzuki et al. |
| 5,517,419 | A |   | 5/1996 | Lanckton et al. |
| 5,530,759 | A |   | 6/1996 | Braudaway et al. |
| 5,596,494 | A |   | 1/1997 | Kuo |
| 5,606,609 | A | * | 2/1997 | Houser et al. ............. 713/179 |
| 5,799,082 | A | * | 8/1998 | Murphy et al. .............. 380/10 |
| 5,875,249 | A | * | 2/1999 | Mintzer et al. ............. 380/54 |
| 5,898,779 | A | * | 4/1999 | Squilla et al. ............. 713/176 |
| 6,064,764 | A | * | 5/2000 | Bhaskaran et al. ......... 382/183 |
| 6,192,138 | B1 | * | 2/2001 | Yamadaji .................... 382/100 |
| 6,216,228 | B1 | * | 4/2001 | Chapman et al. .......... 713/176 |

* cited by examiner

*Primary Examiner*—David Ometz
*Assistant Examiner*—Luong T. Nguyen
(74) *Attorney, Agent, or Firm*—F. Chau & Associates, LLC; Frank V. DeRosa, Esq.

(57) ABSTRACT

An image capturing system and method for automatically watermarking a plurality of recorded camera and image parameters such as the location (latitude, longitude and altitude), orientation of the principal axis of the camera, whether the camera is in landscape mode or portrait mode, camera velocity, photographer information, time and date, zoom factor, shutter speed, flash on/off, autofocus distance, lightmeter reading, focal length and aperture into every captured image. This watermarked data can be subsequently extracted and compared with the originally recorded data so as to verify the authenticity of a corresponding image. Since the critical data is invisibly watermarked into the image, it is difficult to modify the image without affecting the watermarked data.

22 Claims, 7 Drawing Sheets

IMAGE CAPTURING SYSTEM AND METHOD FOR AUTOMATICALLY WATERMARKING RECORDED PARAMETERS FOR PROVIDING DIGITAL IMAGE VERIFICATION

BACKGROUND OF THE INVENTION

1. Technical Field of the Invention

This invention generally relates to a system and methods for digital image verification and, more particularly, to an image capturing system and methods for automatically recording and watermarking a plurality of camera and image parameters with a digital image (still and video) for verifying the authenticity of the digital images.

2. Description of the Related Art

It is often necessary to determine the conditions and circumstances (such as time, date, and location) in connection with the capturing of an image. For instance, such information can be of immense value to insurance agencies (e.g., real-estate, auto, and fire), hospitals, news agencies and crime investigating agencies, for confirming the details surrounding an accident so as to assist in the investigation of the accident and preparing the necessary accident reports. Moreover, this information would also be useful for image search algorithms that are based on such information. Therefore, an image capturing device which can automatically record a plurality of parameters with each captured image, such as names of geographic locations, altitude, longitude, time, date, photographer identification, as well as image data such as light intensity, shutter speed and flash status, would be very useful to such agencies.

Furthermore, an image capturing system which could automatically watermark (i.e., hide) the plurality of recorded parameters into each image would be useful for verifying the authenticity of digital pictures, as well as verifying and confirming the circumstances and conditions surrounding the capturing of the digital image. In general, the ability to prove the authenticity of digital images is a burdensome task because there are various commercially available software applications which allow users to manipulate and modify digital images. Therefore, by invisibly watermarking parameters associated with a digital image within the image, the authenticity of the digital image may subsequently be verified by extracting the watermarked parameters and then comparing the extracted parameters with the initially recorded parameters to determine whether they are similar.

There are commercially available film cameras which are capable of recording the time and date on each photographic image. These conventional film cameras, however, do not record additional camera parameters such as location (e.g., altitude and longitude) in an electronically accessible form. Moreover, these traditional film cameras allow a user to set any desired date and time to be recorded with each image, which limits the use of such recorded information for purposes of authenticating digital images.

There are digital cameras that are commercially available which can capture and record the time and date with each image. But like the conventional film cameras, the user can set any desired time and date to be recorded with each image. Moreover, the time and date information are often stored in the header line for the image file. Some digital cameras store these camera parameters in a separate file. The separate file may be encrypted and transmitted along with the image file. The disadvantage with this approach, however, is that the user may create his own camera parameters for an image and then encrypt it and present it as the secure data for the image. Thus, separating the captured image from the encrypted parameter file does not afford a solution to potential tampering of such recorded information.

In addition, there are commercially available cameras which allow other parameters (in addition to time and date) to be recorded with each image. These cameras, however, do not provide means for detecting if such parameters have been modified or if the images have, otherwise, been tampered with. For instance, U.S. Pat. No. 4,574,319 to M. Konishi entitled, "*Electronic Camera Having Non-Image Data Recorder*," teaches the association of a magnetic recording area with each image for conventional film cameras. Camera parameters such as shutter speed, aperture value, frame number, location of image, and the name of the photographer for a given image can be stored in the associated magnetic recording area. This invention, however, assumes a trusted environment and does not teach a method for proving the authenticity of such recorded camera parameters.

Next, U.S. Pat. No. 5,506,644 to Suzuki et al. entitled, "*Camera*", teaches the connection of a Global Positioning System (GPS) receiver to the camera so as to record the location at which the image was taken. Again, this invention does not deal with proving the authenticity of recorded location parameters and assumes a trusted environment.

Furthermore, U.S. Pat. No. 5,247,356 to J. Ciampa entitled, "*Method and Apparatus for Mapping and Measuring Land*", teaches the association of geographical location information with each picture and stores the information in unused portions of an analog image, such as the vertical blanking interval, or in the border of a digital image. The disadvantage to this is that, by storing data in such obvious places, a hacker can easily detect and modify such parameters.

On the other hand, U.S. Pat. No. 5,499,294 to G. Friedman, entitled, "*Digital Camera with Apparatus for Authentication of Images Produced From an Image File*" teaches a method for verifying the authenticity of a digital image. This invention utilizes the concept of public and private keys. Each camera is assigned a private key. Initially, a hash code based on the contents of the image is computed. The hash code is then used to generate a digital signature using the private key. The digital signature is then decrypted using a public key to obtain the hash code which is then compared with the original hash code of the image to determine if any alteration has occurred. In addition, the invention teaches that additional camera parameters such as location, orientation, shutter speed, f-stop, etc., may be recorded in the border of the image and be used to compute the hash function. One disadvantage with this approach is that the image file and the digital signature are separate entities. Therefore, two entities are needed every time an image has to be authenticated. Further the two entities may become disassociated during transmission, thus, making it difficult to track them down.

Based on the above prior art, there are no commercially available image capturing devices which afford automatic recording and watermarking of a plurality of camera and image parameters with each captured digital image. By watermarking (i.e. hiding) the recorded parameters throughout each captured image in a non-obvious manner (in addition to, or in lieu of, storing the parameters in an image header or in a separate file), it is difficult to detect and tamper with the embedded data. Accordingly, the watermarked parameters may be recovered and checked against the parameters which were recorded (e.g., electronically or manually) at the time the image was taken so as to verify the authentic of the image as well as the recorded parameters.

SUMMARY OF THE INVENTION

The present invention is directed to an image capturing system and method for automatically watermarking a plurality of recorded parameters such as the time, data, location (e.g., latitude, longitude and altitude) of the camera into each captured image. In a preferred embodiment, the watermark (or "stamping information") consists of a stream of binary data (i.e., bits) representing one or more of the plurality of recorded parameters. During an image stamping process, the stamping information is invisibly embedded (i.e., stamped) into a source image in accordance with a defined mapping process to produce a stamped image. The mapping process associated with each image is identified by a corresponding decoding "key" (or "verification key"). The stamping process distributes the stamping information in the entire image without generating any visible traces of the stamping information or any visual artifacts in the image, thereby making it difficult to modify the image without affecting the watermarked data. In other words, the stamping information is perceptually invisible and any modification on the image alters the stamping information, and an attacker cannot restore the altered invisible mark stamped onto the image.

During an image verification process, the stamping information (i.e., the watermarked parameters) may be decoded (i.e., extracted) with the corresponding verification key. The extracted information (i.e., camera parameters) is then compared with the camera parameters recorded at the time the corresponding digital image was generated. If the extracted parameters match the originally recorded parameters, the corresponding image is determined to have not been altered since the time the image was stamped.

In an alternate embodiment where the photographer can be trusted, the recorded camera parameters associated with the image may be stored in a separate memory block associated with the generated image (e.g., in an image header) or directly transmitted to a central server.

In one aspect of the present invention, an image capturing system for automatically recording and watermarking a plurality of parameters in a captured image comprises:

a central processing unit for controlling a plurality of functions and operations of the system;

image capture means, operatively connected to the central processing unit, for generating a digital image of an observed image frame and for generating a plurality of image data associated with the generation of the image;

wireless communication means, operatively connected to the central processing unit, for receiving data from objects in the observed image frame when the image is generated;

geographic location determining means, operatively connected to the central processing unit, for determining geographic coordinates of the system when the digital image is generated;

means for determining a time and a date when the image is generated;

information receiving means, operatively coupled to the central processing unit, for receiving data associated with a user of the system when the digital image is generated;

image processing means for receiving the plurality of parameters and recording the plurality of parameters with the generated digital image, the plurality of parameters including the plurality of image data, the object data, the time data, the date data, the location data, and the user data; and means, operatively coupled to the image processing means, for watermarking the plurality of parameters into said image.

These and other objects, features and advantages of the present invention will become apparent from the following detailed description of illustrative embodiments, which is to be read in connection with the accompanying drawings.

DESCRIPTION OF PREFERRED EMBODIMENTS

Figure 1:
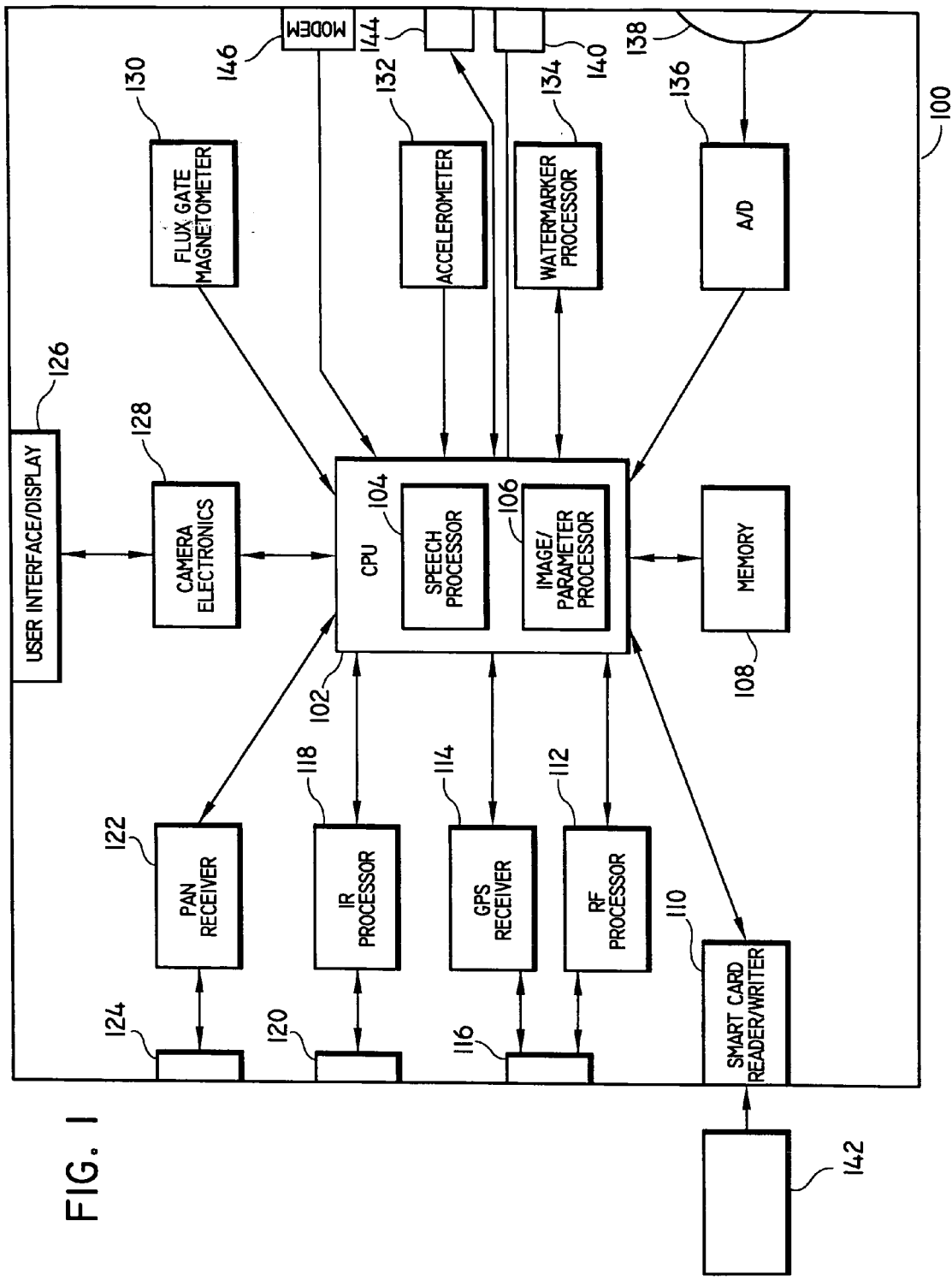
FIG. 1. is a block diagram of an image capturing system for automatically recording and watermarking a plurality of camera and image parameters in accordance with an embodiment of the present invention.

Referring to FIG. 1, a block diagram of an image capturing system for automatically recording and watermarking a plurality of camera and image parameters with each photograph and/or video (collectively referred to as "digital image") in accordance with an embodiment of the present invention is shown. Preferably, the system 100 of FIG. 1 is a camera (which is capable of capturing still and/or video images) having conventional components such as a photographic lens and shutter, a flash, and means for receiving and converting light energy from the photographic lens into suitable electric signals and processing such signals (which are not shown). It is to be understood, however, by one of ordinary skill in the art that the system of FIG. 1 is not limited to a camera, but may be embedded in other CPU based systems such as a portable computer or any PDA device having the components (to be described below) of the system 100, as well as other conventional camera components such as a photographic lens for capturing images.

The digital camera 100 of FIG. 1, includes a central processing unit (CPU) 102 which controls the operations of the camera 100 via, e.g., programs stored in a memory 108 and executed by the CPU 102. In particular, the CPU 102 includes a speech processor module 104 for processing voice data or voice commands which are input into the camera 100 through a microphone 138. An analog to digital (A/D) converter 136 converts analog acoustic signals from the microphone 138 into digital signals for processing by the speech processor module 104. The CPU 102 also includes an image/parameter processor module 106, for recording a plurality of parameters (to be further explained below) onto digital images and for compressing the digital images using known data (image) compression techniques such as the Joint Photographic Expert Group (JPEG) coding standard. Although the illustrative embodiment herein shows the CPU 102 comprising the speech processor module 104 and the image/parameter processor module 106, it is to be understood that such modules may also be implemented as separate modules each having a processor, associated memory and stored programs for performing such functions.

The camera 100 includes a plurality of components which are used for generating the parameters which can be recorded and watermarked onto the digital images and subsequently utilized (discussed in detail below) for verifying the authenticity of the image. For instance, the camera 100 includes conventional camera electronic circuitry 128 for controlling and measuring various parameters such as lens focal length, auto focus distance, shutter speed, exposure duration, aperture setting, frame number, image quality (e.g., high, medium or low), flash status (e.g., on or off) and light meter readings.

In addition, a flux gate magnetometer (FGM) 130 of any conventional type is operatively connected to the CPU 102 for measuring the orientation of the principal axis of the camera 100 (in 3 dimensions). For instance, the FGM 130 provides an "image mode" parameter to indicate whether the camera 100 is in a portrait mode (vertical dimension is larger) or landscape mode (horizontal dimension is larger) mode. Alternatively, the camera 100 may include either a conventional gyroscope or compass (not shown) in lieu of the FGM 130 for determining the orientation of the camera 100. Also included is a GPS receiver 114, operatively connected between an RF port 116 (e.g., an antenna) and the CPU 102, for recording the geographic position (e.g., latitude, longitude, and altitude) of the camera 100, as well as Universal Time Coordinated (UTC) time and date and local time and date when an image is taken. It is to be appreciated that additional data such as such as the fix quality (i.e., the ability of the receiver to pick up satellite signals) and the number of satellites in view may be obtained and recorded via the GPS receiver 114. Such information may be used, e.g., to determine if the image was taken indoors or under trees or on a cloudy day. An accelerometer 132 is provided for computing the displacement of the camera 100 from its last determined position when satellite coverage is poor or while the camera 100 is indoors (i.e., the GPS signal is weak or undetectable) so that the position of the camera 100 may be accurately recorded.

The camera 100 further includes a smartcard reader/writer 110 (as is known in the art) for reading and writing information to and from various cards, e.g., magnetic cards, IC cards and/or EAROM cards (which are collectively indicated by smart card 142) using known standards and techniques. The smart card reader/writer 110 may be utilized for obtaining additional recordable parameters such as the identity of the photographer, which can be subsequently utilized for verifying the authenticity of the images.

A Personal Area Network (PAN) receiver 122, operatively connected between a PAN interface 124 and the CPU 102, is incorporated into the camera 100 for obtaining recordable parameters using the constructions and methods disclosed by T. G. Zimmerman in the article: "Personal Area Networks (PAN): Near-Field Intra-body Communication" Proc. 4th Ann. Wireless Symposium, Feb. 12–16, 1996, Santa Clara, Calif., USA. As disclosed in the above PAN reference, information may be communicated between persons and systems via the PAN which links special electronic devices having a transceiver and CPU carried on the individuals using human conductivity. Such concept may be employed in the present invention whereby the identity of the photographer is transferred to the camera 100 upon human contact (e.g., holding the camera) when the image is taken rather than transferring such information to the camera 100 through a magnetic or smartcard or wireless communication.

The camera 100 preferably includes a radio frequency (RF) processor 112, operatively connected between the CPU 102 and the RF port 116, for processing incoming RF, as well as transmitting RF information, via the RF port 116 using conventional constructions and techniques. The device may also include an infrared (IR) processor 118 operatively connected between the CPU 102 and an IR port 120, for processing incoming optical information and for transmitting optical signals using conventional constructions and known techniques. In particular, the IR processor 118 and the RF processor 112 may be utilized for communicating with objects in a scene being photographed (assuming the objects being photographed are transmitting either RF or IR signals) so as to obtain and record information such as the name and identity of the object. In addition, the IR and RF processors can be used for transmitting (i.e., downloading) digital images from the camera 100 to a computer having IR and/or RF receivers.

These parameters (in addition to other parameters discussed below) are generated with each digital image and provided to the image/parameter processor 106 wherein they are recorded onto the digital image. These parameters are preferably recorded in a header file associated with each digital image. A user interface/display 126, operatively connected to the camera electronics 128 and the CPU 102, is preferably a liquid crystal display (LCD) touch screen display (or equivalent user interface), for allowing a user to specify (i.e., choose) which of the plurality of parameters are to be recorded with the digital images (under the control of a suitable software program). The user interface/display 126 also is also utilized for displaying the "mode" of the camera 100 (i.e., the camera will keep track of which parameters should or should not be recorded at any given time). Alternatively, the interface/display 126 may be comprised of a keyboard and a conventional LCD display, which allows the user to further annotate each image with text descriptions (i.e., text parameters).

In addition, the user-specified parameters may be chosen (or precluded) via voice activated commands (e.g., by stating into the microphone 138 "I want to have shutter speed recorded with the image"). Such voice commands are then received by the CPU 102 via the A/D converter 136 and processed in the speech processor module 104. It is to be appreciated that the digital images may also be annotated through voice data. It is to be understood that any conventional command and control engine for speech recognition may be employed in the present invention such as the commercially available large vocabulary IBM VIAVOICE GOLD system to perform the speech recognition functions in accordance with the present invention.

Referring to FIG. 1, the camera 100 preferably includes a serial port interface 140 and a parallel port interface 144 (utilizing known computer interface standards such as RS232 and USB), operatively coupled to the CPU 102, to provide means for establishing a communication link between the camera 100 and a server/computer (not shown) so as to, e.g., download digital images stored in memory 108 to a database within the server/computer. In addition, a modem 146 (of any conventional type) and an associated conventional telephone line interface (not shown) is included for establishing communication between the camera 100 and a remote server/computer (not shown).

The camera 100 further includes a watermarker processor 134, operatively coupled to the central processing unit, for watermarking the user-specified parameters within each image in accordance with the present invention. The user of the camera 100 can specify (via the user interface display 126) which of the plurality of parameters are to be watermarked into the digital images (under the control of an applicable software program). The user interface/display 126 also is also utilized for displaying which of the parameters are being watermarked at any given time. The image processor provides the captured image (or "source image") along with the specified recorded parameters to be watermarked to the watermarker processor 134. Alternatively, the source image may first be compressed (using conventional compression methods such as the preferred JPEG standard) and the parameters watermarked into the compressed digital image. It is to be appreciated that any conventional watermarking method may be employed in the present invention. The preferred watermarking system and method (for both digital images and compressed digital images), however, is disclosed in application Ser. No. 08/780,484, entitled: "*An Invisible Image Watermark for Image Verification*", which is commonly assigned to the present assignee and which is fully incorporated herein by reference. As discussed in detail below, the preferred watermarking method allows the recorded parameters to be watermarked into every captured image, which parameters may then be later used for verifying the authenticity of pictures, as well as for indexing and searching photo albums. Since the parameters are watermarked into the image, it is difficult to modify the image without affecting the watermarked data. An alternative preferred embodiment for the watermarking process is disclosed in U.S. Pat. No. 5,530,759 to Braudaway et al., entitled: "COLOR CORRECT DIGITAL WATERMARKING OF IMAGES".

The following table illustrates the parameters that can be recorded and watermarked with each image. It is to be understood, however, that the table is not illustrative of every parameter which may be recorded and watermarked and that one of ordinary skill in the art could envision additional parameters that may be recorded and utilized in accordance with the teachings of the present invention herein.

| Field | Description string | Length (Bytes) |
| --- | --- | --- |
| Location | Latitude (e.g. N 41 45.721), Longitude (e.g. W 76 35.420) Altitude (e.g., 1.500E + 2 m) | 72 |
| Principal axis orientation | Azimuth (e.g., 030.12 degrees), Altitude (+20.19 degrees) | 12 |
| Camera Velocity | in m/sec or ft/sec (e.g., 1.100E + 2 m/sec) | 8 |
| Image mode | Portrait (P) or Landscape (L) | 2 |
| Image quality | high, medium, low or other | 1 |
| Compression scheme | e.g., JPEG | 1 |
| Date | day/month/year (e.g., 12/12/1997) | 10 |
| UTC Time | hr:min:sec (e.g., 10:20:31) | 8 |
| Local Time | hr:min:sec (e.g., 10:20:31) | 8 |
| Exposure Duration | hr:min:sec (e.g., 1.000E + 1 msec) | 8 |
| Aperture | f-stop (e.g., f11) | 2 |
| Light meter reading | lux (e.g., 1.001E + 0 lux) | 8 |
| Flash Status | ON/OFF | 1 |
| Lens focal length | in mm (e.g., 5.000E + 2 mm) | 8 |
| Auto focus distance | in m (e.g., 1.510E + 2 m) | 8 |
| Frame no | frame counter value since last reset | 4 |
| Voice annotation | ascii text | 20 |
| Photographer | ascii text | 30 |
| | | 211 |

As shown in the table, the memory required for storing the recorded parameters is a few hundred bytes, which is significantly less than the memory needed to store a compressed image. For instance, a 1152×864 digital image captured by the commercially available Kodak DC 210 camera and stored in JPEG format requires approximately 320 KB. Indeed, the few hundreds of bytes used for the camera parameters is a small fraction of the total storage required even for a highly compressed image. Consequently, the parameter data can easily be recorded with the image with no significant change in the storage requirements of the image. In addition, this data can typically be hidden into the image with no loss of image quality.

Figure 2:
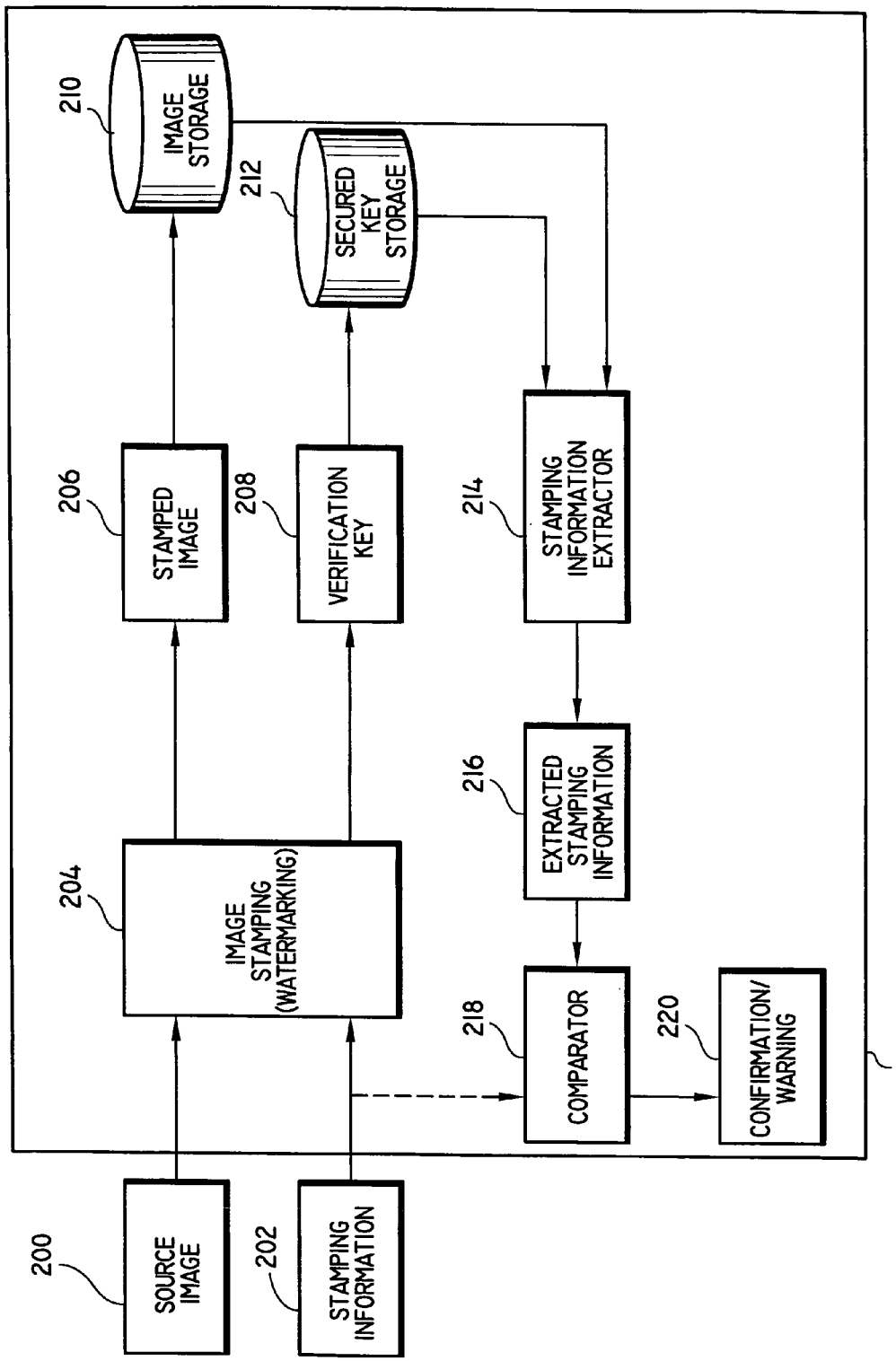
FIG. 2 is a block diagram of a preferred architecture for a watermarker processor of the image capturing system of FIG. 1 in accordance with the present invention.

The preferred watermarking process in accordance with the present invention (as disclosed in the above U.S. application Ser. No. 08/780,484) will now be described in detail with reference to FIG. 2, which is a block diagram of a preferred architecture for the watermarking processor shown in FIG. 1. Specifically, FIG. 2 is a functional block diagram of the watermarker processor 134 of FIG. 1 for providing image stamping and verification in accordance with an embodiment of the present invention. The watermarking processor 134 is operatively coupled to the image/parameter processor 106 for receiving a source image 200 and the stamping information 202 (i.e., parameters to be watermarked), which are provided by the image/parameter processor 106. The source image 200 and the stamping information 202 are sent to an image stamping module 204, wherein they are combined to produce a stamped source image 206. During the image stamping process, the stamping information is embedded into the source image, S(I,J), to produce a stamped source image SS (I,J) (I and J integers locating a particular value in a matrix and representing, e.g., Ith column and Jth row). The stamped source image 206 should appear perceptually to be nearly identical to the source image 200, although it has the stamping information 202 embedded in it. In other words, the stamping information is hidden invisibly and directed into the original image values. The functional components of the image stamping module 204 and the corresponding stamping method of the incorporated U.S application Ser. No. 08/780,484 will be discussed in further detail below with reference to FIGS. 5 and 6, respectively.

A verification key 208 corresponding the parameters used for watermarking is also produced. As described in above incorporated U.S application Ser. No. 08/780,484, in one preferred embodiment, the verification key can be a set of binary look-up-tables (LUT's), or can be a number and a known function generator of the number which can be used to generate the required set of binary LUT's. To produce the key, a random number generator is used to generate randomly a sequence of numbers, each number can then be mapped through a known function to a bit value, and each bit value becomes one entry to the binary LUT's that serve as the verification key 208.

The stamped images are stored in an image archive 210. The image archive 210 may be located in the camera 100 (FIG. 1). Alternatively, the image archive can be located in a remote server (not shown), whereby the stamped image is transmitted (e.g., via wireless communication or modem) to a desired location. The verification keys are stored in a secured storage 212. The secured storage 212 may also be located in the camera 100 or in a remote server.

It is to be appreciated that image verification processing can also be performed with the watermarker processor 134. It is to further appreciated that image verification processing may also be performed by the remote server in which the image archive 210 and the key archive 212 are located. The watermarker processor 134 includes a stamping information extractor for receiving a stamped image from the archive 210 and the corresponding verification key of the stamped image from the secured storage of the keys 212. The stamped source image and corresponding verification key are processed by the stamping information extractor module 214 wherein the stamping information embedded on the retrieved stamped image is extracted. The extracted stamping information 216 and the original stamping information 202 (the recorded camera parameter corresponds to the source image) are provided to a comparator module 218, which compares the extracted stamping information with the originally recorded parameters. The result of the verification is then provided to a confirmation/warning module 220 to either confirm the authenticity of the image (assuming there is a match between the extracted data and the recorded data) or to warn the user of potential fraud and to take appropriate measures (assuming that there is no match between the extracted data and the recorded data). Assuming the verification process is performed in the server system at a remote location, such actions may include alerting the system administration of potential abuse as well as restricting the access of images whose content integrity is under investigation.

Figure 3:
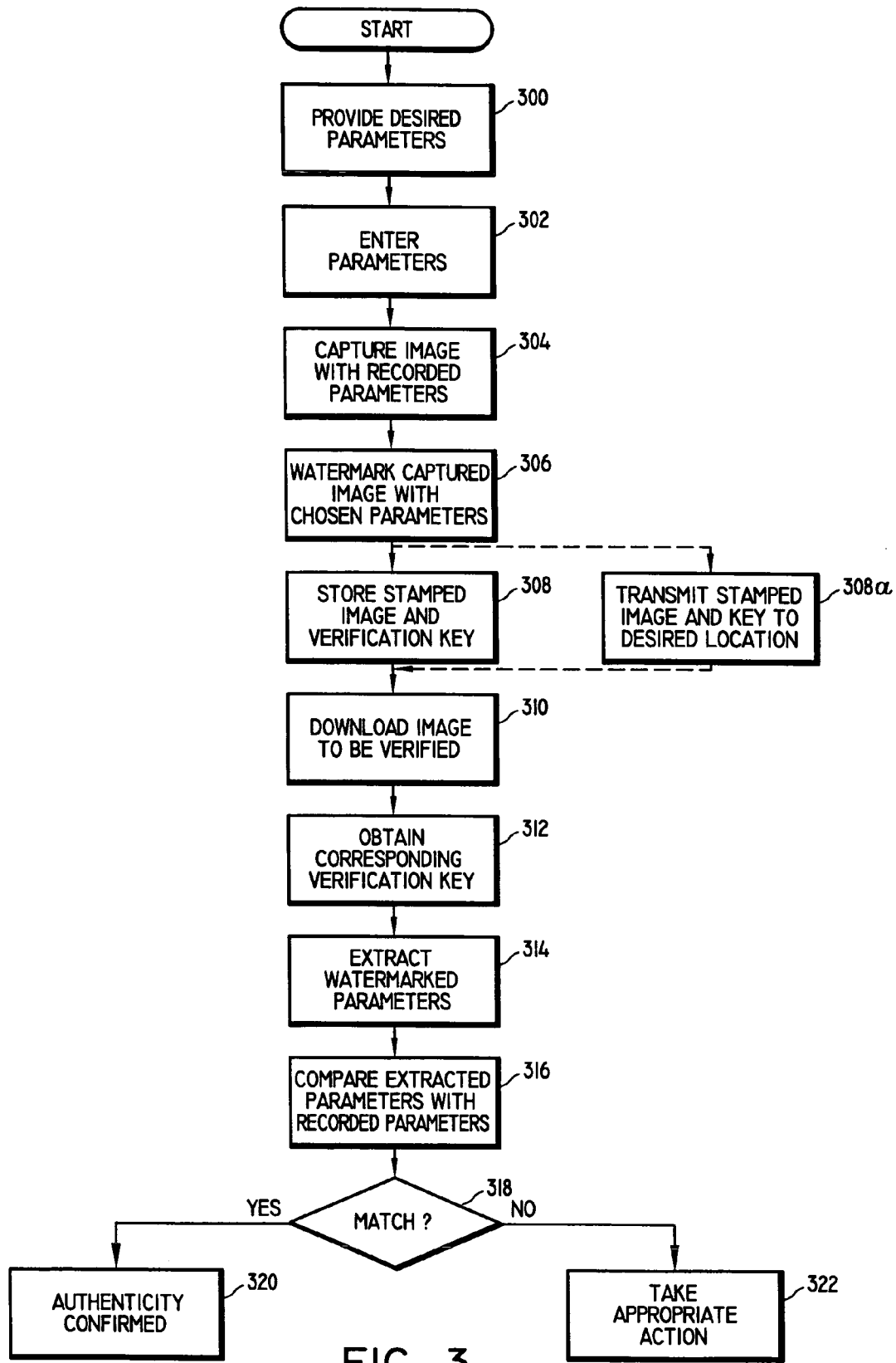
FIG. 3 is a flow diagram of a method for image verification in accordance with the present invention.

Referring now to FIG. 3, a flow diagram of a method for image verification in accordance with the present invention is illustrated. By way of example, assume that a person working as a claims adjuster for a fire insurance agency is given the task of taking photographs of a residential home which has been partially destroyed by fire. The claims adjuster (i.e., photographer) will be provided with pertinent information (i.e., parameters) such as the location (e.g., city and address or latitude and longitude) of the residence which must be photographed (step 300). Upon arriving at the desired location, the claims adjuster will enter the desired parameters which are to be recorded and/or watermarked into the camera 100 via the input/display 126 (step 302). The photographer will then take pictures of the residence and the specified parameters (e.g., location, date and time) will be recorded with each captured image (step 306). In addition, the parameters that are specified to be watermarked will be stamped into each captured image and the corresponding verification key (which is based on the watermarked parameters) will be generated (step 306). It is to be understood that, alternatively, the desired parameters may be watermarked into the captured image without being recorded within the header file of the captured image. In particular, the parameters may be separately recorded in a file which can be, e.g., stored in the memory 108 and subsequently downloaded to a central server remotely located at an office of the insurance agency via the modem 146 or by RF transmission via the RF processor 112. In addition, the desired parameters (such as time date and location of the captured image) may be manually recorded and later used to verify the authenticity of the corresponding image.

Once the desired parameters are watermarked, the stamped image and corresponding verification key will then be stored within the camera (step 308). Alternatively, the stamped image and corresponding verification key can be directly transmitted (e.g., via IR, RF or modem) to the central server which is located in an office of the insurance agency (step 308a).

When the authenticity of a given image must be verified, the associated stamped image will be downloaded from memory (step 310) (e.g., from the camera 100 or the central server in which such image is stored). As indicated above, the verification process may be performed via the watermarker processor 134 in the camera 100 or at the remote location (e.g., insurance agency) by downloading the image from the server. The verification key which corresponds to the stamped image will also be obtained to perform the verification process (step 312). The watermarked parameters (stamping information) will then be extracted from the stamped image using the verification key (in accordance with the preferred extraction method discussed in detail below) (step 314). The extracted stamping information will then be compared with the corresponding parameters that were recorded (e.g. either in the corresponding image header, in a separate corresponding file, or manually) when the image was captured (step 316). For example, if the location (latitude and longitude) were recorded and watermarked with the image, the extracted location data will be compared with the recorded location data. If the recorded parameters match the extracted watermarked parameters (affirmative result in step 318), the authenticity of the image is verified. In other words, since the recorded parameters and the watermarked parameters coincide, the insurance company can be ensured that the images are accurate and have not been fraudulently modified or tampered with. In addition, the insurance agency can confirm that the images were in fact taken at the location (residence) that the claims adjuster indicated in his or her report. If, on the other hand, the recorded parameters and the watermarked parameters do not match, the insurance company will determine that either the image has been modified or that the images were not taken at the corrected location, and, thus, will be able to take the necessary action and investigate potential fraud (step 322).

Preferred Image Stamping and Verification Methods

Figure 5:
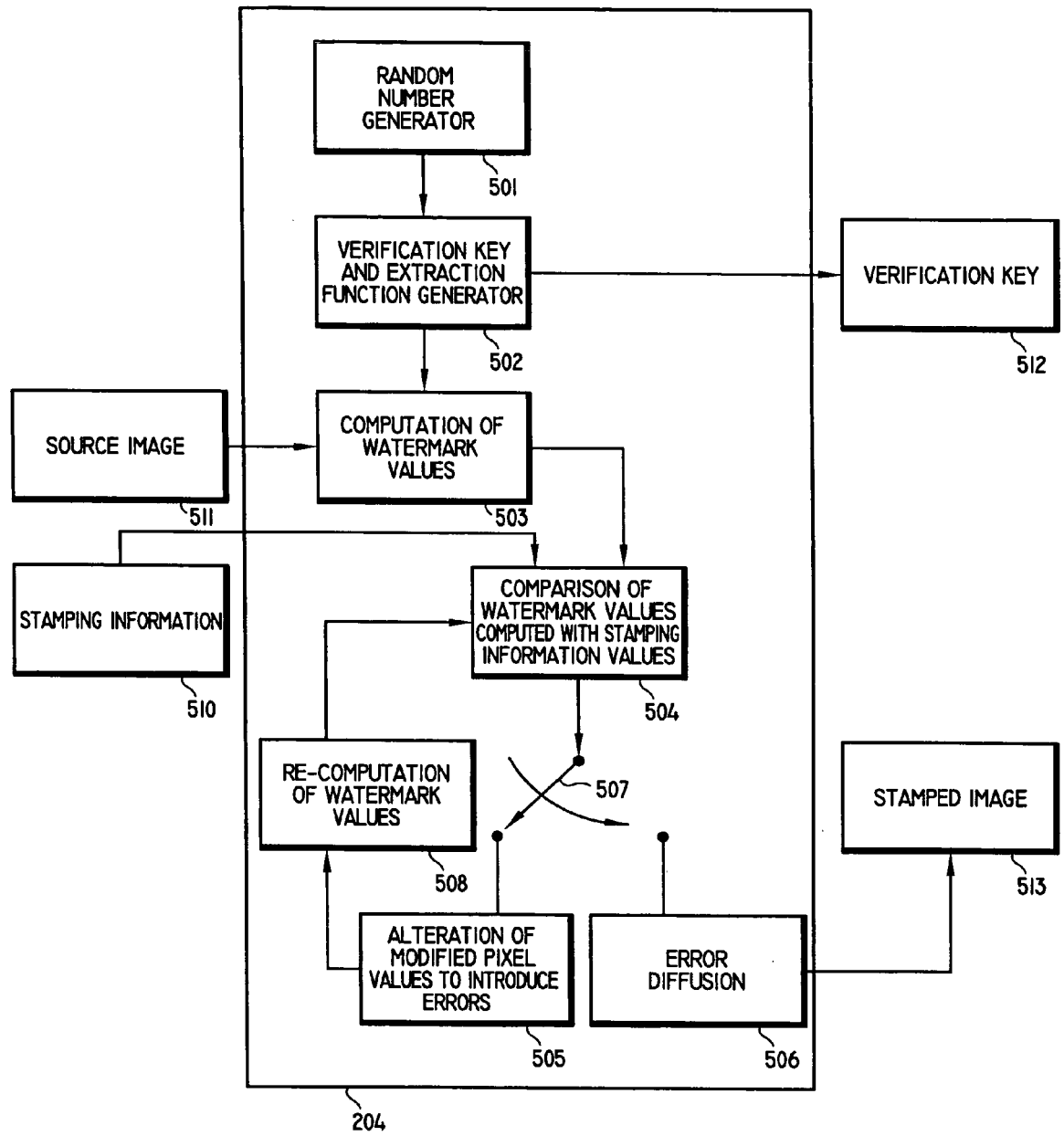
FIG. 5 is a block diagram of functional components of the image stamping module of FIG. 2.

Referring to FIG. 5, a block diagram is shown of the image stamping module 204 of FIG. 2 in accordance with a preferred embodiment of the present invention. The process of embedding the stamping information 510 into a source image 511, S(I,J), to produce a stamped source image 513, SS(I,J) (the I and J integers locating a particular value in a matrix and representing for example, Ith column and Jth row), and without incurring visible artifacts, consists of several major components, illustrated in blocks 502, 503, 505, 506 and 509.

The functional block 502 shows the generation of the verification key and a set of functions to extract the watermark value from a pixel such that the extraction process is secured without the proper key.

As discussed in the above incorporated U.S. application Ser. No. 08/780,484, the verification key can be a set of binary look-up-tables (LUT's), or can be a number and a known function generator of the number which can be used to generate the required set of binary LUT's. To produce the key, a random number generator 501 is used to generate randomly a sequence of numbers, each number can then be mapped through a known function to a bit value, and each bit value becomes one entry to the binary LUT's that serve as the verification key 512. Three binary LUT's are needed for a color source image, and one binary LUT for a monochrome source image. In another approach, the random number generator 501 can generate a seed number to serve as the key 512, and this number can be fed into a known cyclic function generator to be used to reproduce the required binary LUT's.

The binary LUT's serve as the binary mapping functions in the computation of watermark values of the source image pixel 511, namely S(I,J), as shown in block 503. The computation, or the extraction, of the watermark values is identical in the functionality to that of 404 in FIG. 4 (which is discussed detail below). The only difference is that the input is the source image pixel values S(I,J) instead of the stamped pixel values. For a color source image pixel S(I,J), the three color components values of red, green and blue are denoted by $S_R(I,J)$, $S_G(I,J)$ and $S_B(I,J)$ respectively, and the set of three mapping functions provided by the three LUT's are $LUT_R(*)$, $LUT_G(*)$ and $LUT_B(*)$ respectively. For a monochrome image, the pixel intensity value is denoted by S(I,J) and the mapping function provided by the binary LUT be LUT(*). The watermark extraction function WX(*) is a function of the mapping functions. For each pixel (I,J), the extracted watermark value EW(I,J) is computed as follows: let $\oplus$ be the XOR operator, $$EW(I,J)=LUT_R(S_R(I,J)) \oplus LUT_G(S_G(I,J)) \oplus LUT_B(S_B(I,J))$$

for a color source image and EW(I,J)=LUT(S(I,J)) for a monochrome image.

The computed watermark value of a source image pixel is then compared with the desired value of the stamping information W(I,J), in the comparison process as shown in block 504 to see if the values match or not.

The gateway 507 controls the implementation of the iteration process of the pixel modification, which has two subparts. In the first subpart, in step 505, each source image pixel value is altered such that the computed watermark value is forced to match the desired value in the corresponding pixel in the watermark image, if no match of the watermark values is found at the first testing. For the pixel alteration, the errors introduced by the modification cannot produce visible artifacts in the stamped image so the errors are introduced at predetermined slowly increasing levels in order to alter the image pixel intensity values gradually. Therefore, the process of pixel modification may take several iterations. The watermark value of the altered pixel is recomputed in block 508 with each new error adjustment iteration to check if the re-computed value matches the desired value in block 504. In the second subpart, once the computed watermark value matches the desired watermark value, then the iteration stops and the errors introduced in the pixel-value alteration step are then diffused in block 506 to neighboring pixels in such a way to maintain a constant average color intensity values in the neighboring pixels.

For a color image pixel, the three color values of the pixel are altered. The pixel values have to be modified in a way such that the distortions are minimal. Any color intensity value can be modified at a given iteration. The level of adjustment starts from +1 or −1 and gradually increases in magnitude in subsequent iterations. Book-keeping of the current level of adjustments in each color component is used to ensure that the magnitude of level change increases gradually. The maximum level of adjustment is controlled to ensure the alteration does not lead to significant difference in visual quality of the image.

The selection of color to be altered at a given iteration can be achieved by using predefined tables or by incorporating random number generators in the selection process. The advantage of using random number generators is that the modifications are spread out to all the three colors instead of concentrating at a particular color for a majority of the pixels. The effect is especially prominent in the encoding of synthetic images in which a large area may be of uniform intensity values. A systematic scheme in the selection of pixels to modify can lead to the concentration of alteration in one particular color (+ or −) of level adjustment is also made random at each pixel to smooth out the errors produced locally.

For a monochrome image, the pixel alternation is a straight forward adaptation of the method used in the alternation of color pixels: the gradual adjustments of the pixel values are confined to one intensity component instead of the three color components.

The errors produced by the pixel value alteration described above are then diffused as shown in block 506, so that the average image intensity values are preserved; this produces the proper average color as the errors are diffused locally over an image to smooth out the alterations.

Error diffusion is commonly used for smoothing the transitions of colors around neighboring pixels in the conversion of true colors to limited color palettes. The process produces good quality color images by adding natural texture and color transitions in place of sudden changes. Error diffusion is employed for similar reasons in the encoding unit such that the errors produced by altering the pixel values (which is equivalent to the quantization errors in the color conversion process) will spread to neighboring pixels. This method enables retention of the proper average color and eliminates unwanted local artifacts. Specifically, as discussed in detail in the above incorporated U.S. application Ser. No. 08/780,484, the process of embedding stamping information 510 into the source image pixel values introduces errors and alters the pixel values. The errors introduced, however, do not cause visual quality degradation to the image as the errors are spread out locally by utilizing known error diffusion techniques. This process is repeated until every pixel in the source image has been stamped. The stamped source image 513 should appear perceptually to be nearly identical to the source image 511, although it has the stamping information 510 embedded in it. In other words, the stamping information is hidden invisibly and directed into the original image values.

When the stamping process is completed, a stamped image 513 is produced as the output and incorporates the stamping information in its pixel values. In addition to the output stamped image 513, a verification key 512 is produced in the process for the subsequent image verification process.

Figure 6:
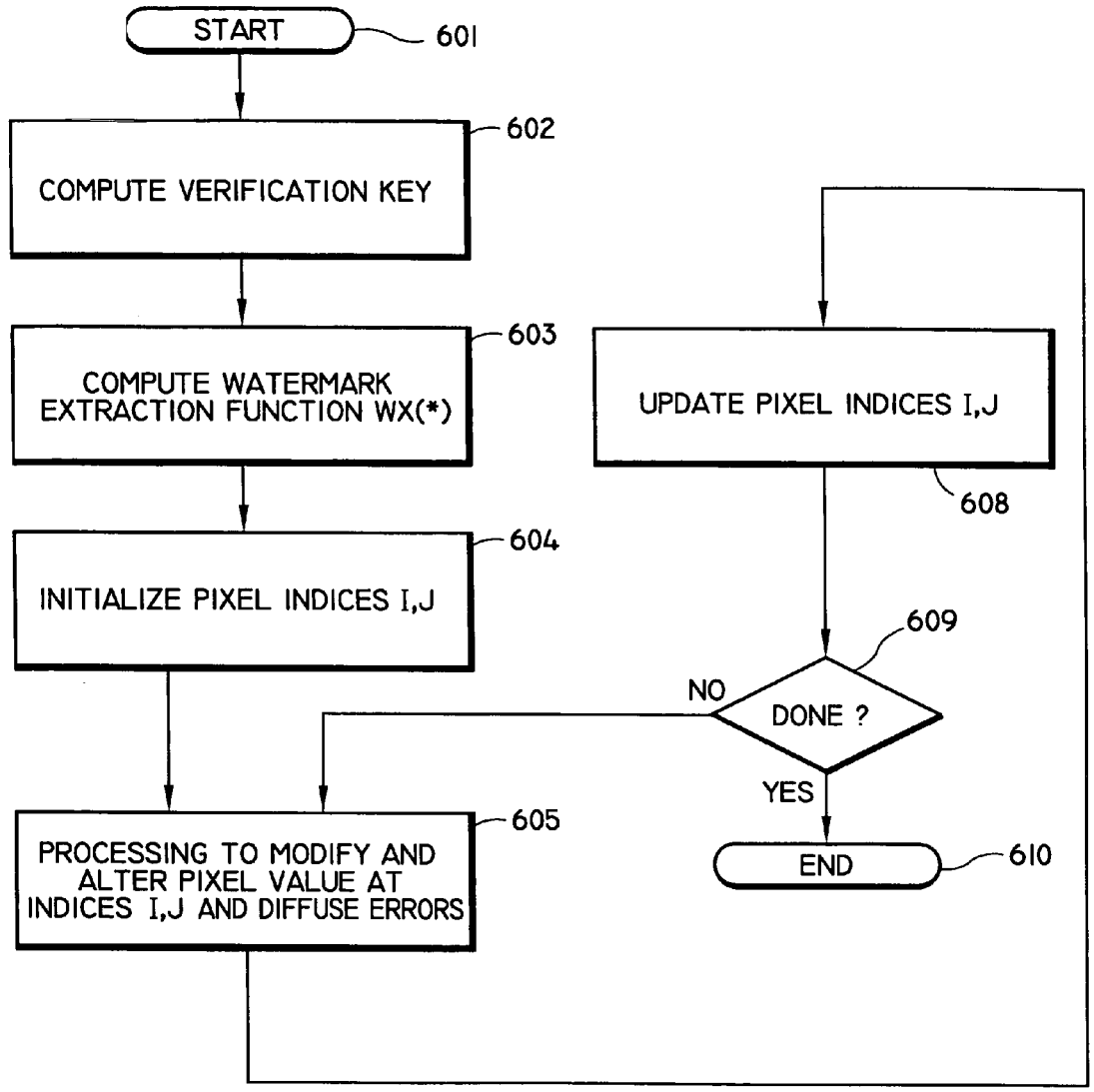
FIG. 6 is a flow diagram of an exemplary image stamping method in accordance with the present invention.

Referring now to FIG. 6, a flow diagram of a preferred image stamping process in accordance with the present invention is shown. The image stamping process begins at step 601 by computing the verification key (step 602), computing the watermark extraction function WX(*) (step 603), and initializing the indices, I and J, for the pixel to be processed (step 604). The pixel at location (I,J) is then processed (step 605) (which is an iterative processing) to modify pixel value at location (I,J) by introducing errors, and to diffuse the errors to neighboring pixels (in accordance with the diffusion method discussed in detail in the incorporated U.S. application Ser. No. 08/780,484). The pixel indices (I,J) are incremented to the indices of the next pixel to be processed (step 608), and a test is performed to determine whether the entire source image has been processed (step 609). If the entire source image has been processed (affirmative result in step 609) the image stamping process is complete, otherwise processing returns to step 605.

Figure 4A:
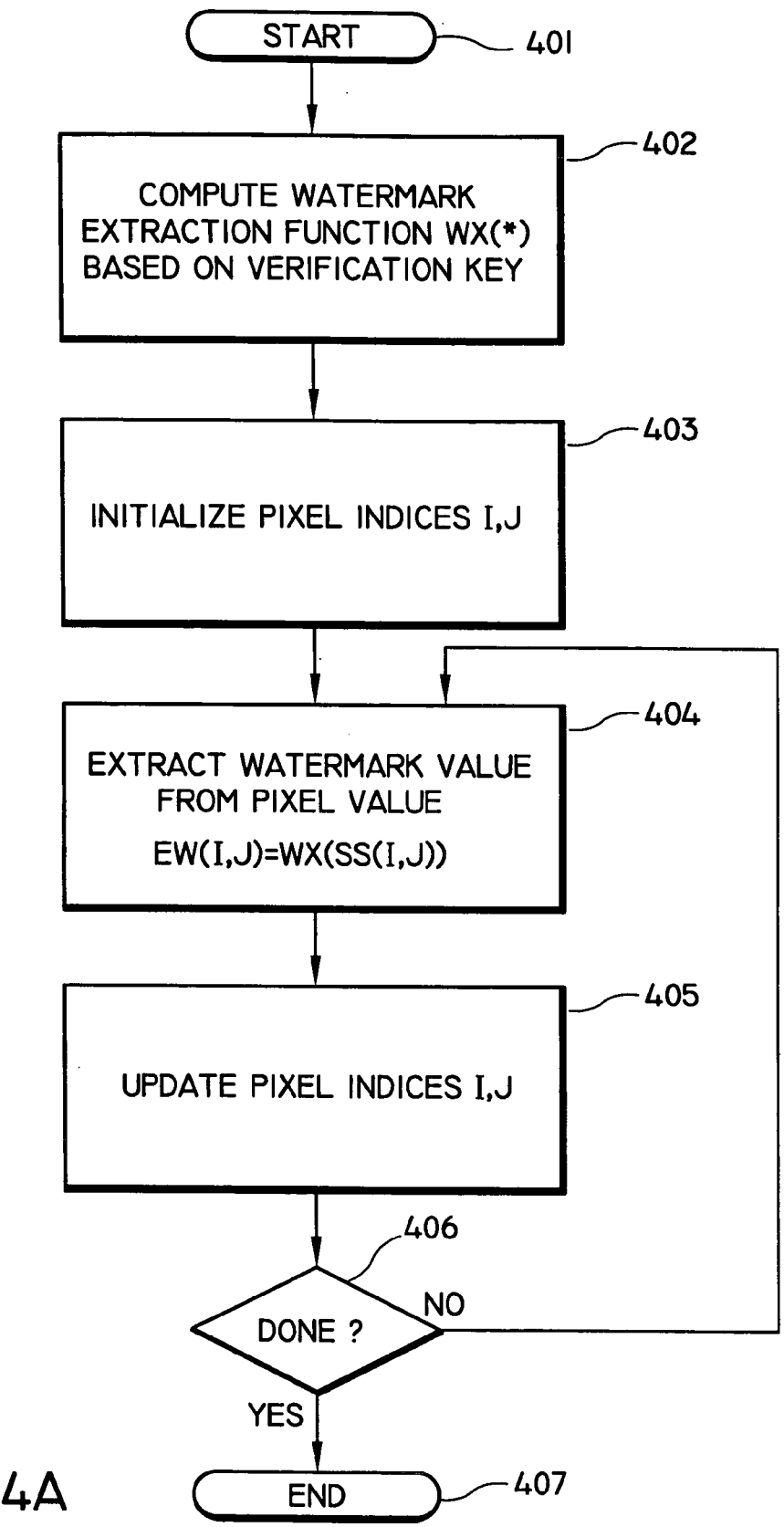
FIGS. 4a and 4b is a flow diagram illustrating an exemplary method for extracting embedded stamping information from a stamped image during an image verification process, and a block diagram illustrating extraction of a watermark value from an input image pixel, respectively, in accordance with the present invention.

Referring now to FIG. 4a, a flow diagram of the preferred embodiment of extraction process as disclosed in the above incorporated U.S. application Ser. No. 08/780,484 in accordance with a preferred embodiment of the present invention is shown. The stamping information EW(I,J) is to be extracted from the stamped source image, SS(I,J). The processing begins (step 401) by comparing the watermark extraction function, WX(*) based on the corresponding verification key (step 402), and initializing the pixel indices, I and J, to the indices of the first pixel to be processed (step 403).

The watermark extraction function WX(*) is then applied to the pixel SS(I,J) to produce the extracted stamping information at the pixel EW(I,J) (step 404):

$$EW(0I,J)=WX(SS(I,J)).$$

The pixel indices are then incremented (step 405) to the indices of the next pixel to be processed, and the pixel indices are tested (step 406). If all pixels in the stamped-source image have been processed, then the watermark extraction process is complete (step 407). If, on the other hand, all pixels in the stamped source image have not been processed, then the watermark extraction function is applied to the next pixel (return to step 404), the pixel indices are again updated (step 405), and the indices are again tested (step 406) to determine whether all pixels in the stamped source image have been processed. In short, the watermark extraction process is repeated until every pixel in the stamped-source image has been processed.

For a stamped color image SS(I,J), every pixel (I,J) in the image contains three color-component values showing the red, green and blue color intensities respectively, namely $SS_R(I,J)$, $SS_G(I,J)$ and $SS_B(I,J)$. For a monochrome stamped image, every pixel (I,J) desirably contains only one color intensity value, namely SS(I,J). The watermark extraction function WX(*) is a function computed based on the verification key. More formally, $$EW(I,J)=WX(SS_R(I,J),SS_G(I,J),SS_B(I,J))$$

where WX(*) can be a mapping function which can take an input value (that is, the pixel intensity value) into a binary output value, and the mapping function is given by the verification key.

A different mapping function may be applied for each color intensity value of a pixel, and each mapping function for a single color component is called a color-component mapping function. For a color image, a set of three color-component mapping functions are needed, namely $F_R(*)$, $F_G(*)$ and $F_B(*)$; and for monochrome image, one is needed, namely F(*). In other words, F(*), $F_R(*)$, $F_G(*)$ and $F_B(*)$ each can map an input value (the pixel intensity value) into a binary output value.

These different mapping functions are implemented in the form of binary look-up-tables (LUT's) in which the pixel value serves as the index to a table entry, and the table entry then gives a one-bit value ('0' or '1') output. In this case the verification key is related to a set of binary look-up-tables (LUTs) (three tables for color image and one table for monochrome image), and for the exemplary embodiment may be a number (or a "seed") which can be fed into a known cyclic function generator to generate the set of binary LUT's.

Each binary LUT of the present exemplary embodiment is generated as follows. First, given an index, the table entry is either a '1' or an '0', which is determined in a random fashion. For example, a pseudo random number generator can be used to generate the table entries as arbitrary numbers having a random number distribution. As is known in the art, these pseudo random number generators employ a cyclic functions that receives an input number, called a "seed," and then recursively generate a random output value. In one embodiment, the function subroutines srand( ) and rand( ) of the standard library of the C programming language are used. For each random output value, the table value is set as '0' if the random output value is even, and '1' if the random output value is odd. However, as would be apparent to one skilled in the art, the random table entries could be generated in any number of ways; for example, by using values generated by linear feedback shift registers, values from random number tables, or any other orthogonal function sequences.

Figure 4B:
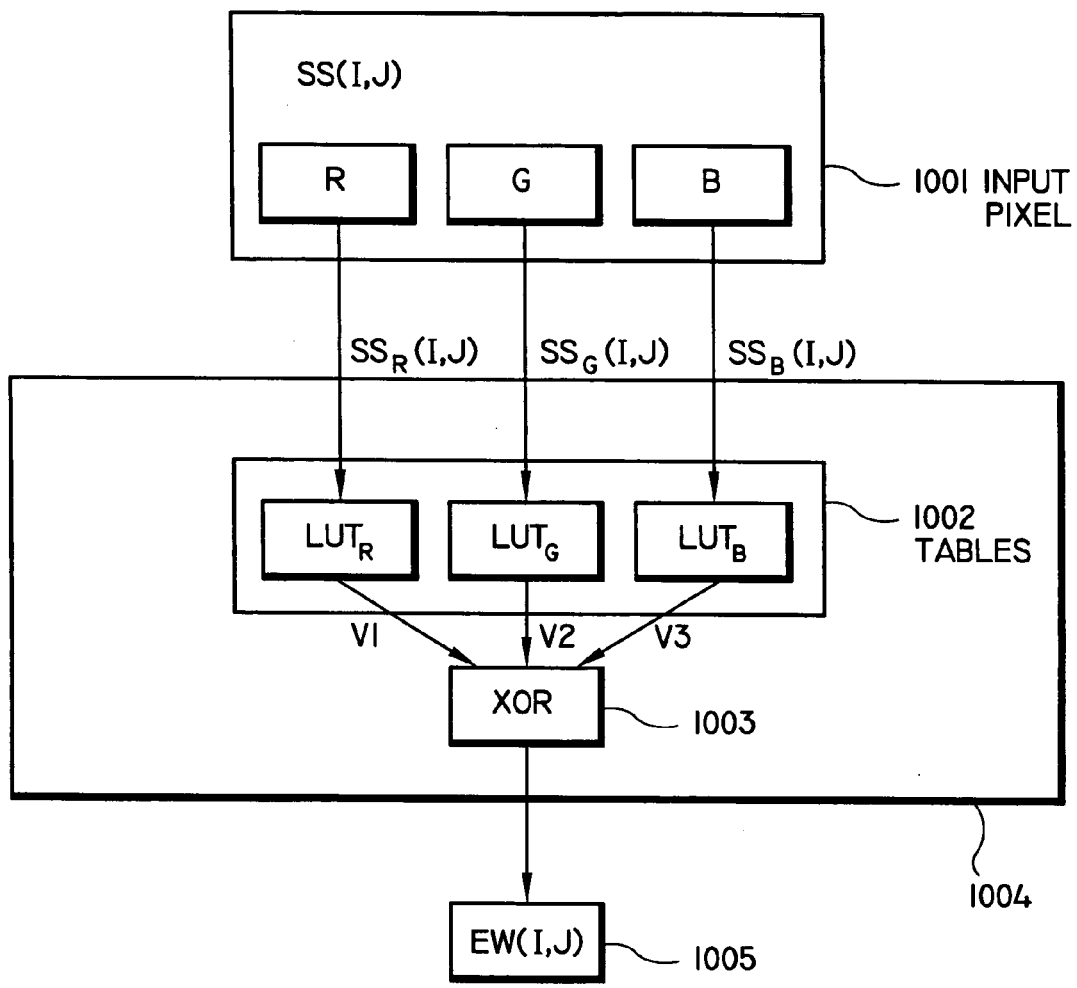

The watermark extraction step 404 is illustrated in FIG. 4b. Given a stamped image pixel SS(I,J) 1001, the intensity value of each color component, $SS_R(I,J)$, $SS_G(I,J)$ and $SS_B(I,J)$, respectively, serves as the index to the corresponding binary look-up-table (LUT), namely $LUT_R$, $LUT_G$ and $LUT_B$ (as shown in 1002) for Red, Green and Blue color, respectively. The table entry of each index is read as the output. For each color, a one-bit output ('0' or '1') is obtained from the table, namely V1, V2 and V3. These three output bits then undergo the XOR (Exclusive OR Operator) operation 1003 to give the final desired watermark bit value EW(I,J) 1005 for the (I,J)th pixel. In mathematical terms, let the exclusive OR operator be represented by $\oplus$, $$EW(I,J)=LUT_R(SS_R(I,J))\oplus LUT_G(SSG(I,J))\oplus LUT_B(SS_B(I,J))$$

for a color stamped image (and EW(I,J)=LUT(SS(I,J)) for a monochrome image). For example, if an image pixel SS* has the color intensity values $$SS_R^*=134, SS_G^*=255, SS_B^*=255;$$

and $$LUTR(134)=0, LUTG(255)=0, LUTB(255)=1;$$

then the extracted watermark value EW* of SS* becomes $$EW^*=0\oplus0\oplus1=1.$$

In the above example the watermark extraction function WX(*) is the combination of the XOR function and the mapping functions given by the LUT's as shown in 1003. Many other possible mapping functions and combinations of mapping functions can be implemented as the watermark extraction function.

The comparison of extracted watermark values EW(I,J) and the watermark image values W(I,J) as shown in the block 218 of FIG. 2 can be accomplished automatically as follows: for each pixel (I,J), the absolute value difference between EW(I,J) and W(I,J) is recorded. For binary watermark values this can either be '0' if the two values match, or '1' if the two values do not match. The absolute value differences for all pixels are added up and if the sum exceeds a predefined threshold, then the stamped image is declared as having been altered. Other automatic comparison algorithms can also be implemented.

Although the illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. An image capturing system for automatically recording and watermarking a plurality of parameters in a captured image, comprising:
a central processing unit for controlling a plurality of functions and operations of said system;
image capture means, operatively connected to said central processing unit, for generating a digital image of an observed image frame and for generating a plurality of image data associated with said generation of said image;
wireless communication means, operatively connected to said central processing unit, for receiving object data from objects in said observed image frame when said image is generated, said object data comprising object identification information;
geographic location determining means, operatively connected to said central processing unit, for determining geographic coordinates of said system when said digital image is generated;
means for determining a time and a date when said image is generated;
information receiving means, operatively coupled to said central processing unit, for receiving user data associated with a user of said system when said digital image is generated, said user data comprising user identification information;
image processing means for receiving said plurality of parameters and recording said plurality of parameters with said generated digital image, said plurality of parameters including said plurality of image data, said object data, said time data, said date data, said location data, and said user data; and
means, operatively coupled to said image processing means, for watermarking said plurality of parameters into said image.

2. The system of claim 1, further comprising means for specifying which of the plurality of parameters should be recorded with said image and for specifying which of said plurality of parameters should be watermarked in said image.

3. The system of claim 2, further comprising means for determining which of the plurality of parameters are specified to be recorded with said image and for determining which of the plurality of parameters are specified to be watermarked in said image.

4. The system of claim 1, further comprising means for extracting said watermarked parameters from said watermarked image.

5. The system of claim 4, further comprising means for comparing said extracted parameters with corresponding recorded parameters of said image to authenticate said image.

6. The system of claim 1, further comprising means for preventing said watermarking of said images if an image quality of said image is altered above a threshold.

7. The system of claim 1, further comprising image compression means, operatively coupled to said image processing means, for compressing said image.

8. The system of claim 7, wherein said plurality of parameters are watermarked in one of said compressed image and said image.

9. The system of claim 1, further comprising orientation determining means, operatively coupled to said central processing unit, for determining orientation data of said system when said digital image is generated; said orientation data being one of said plurality of parameters.

10. The system of claim 1, further comprising
means for receiving one of verbal data and verbal commands; and
means for processing said one of received verbal data and received verbal command, said processed verbal commands being used to control one of a plurality of function and operations of said system, said processed speech data being one of said plurality of parameters for annotating said digital image.

11. The system of claim 1, further comprising means for determining said location of said system when said geographic location determining means is inoperable.

12. The system of claim 1, wherein said plurality of image data associated with said generation of said image includes one of an image mode, image quality, exposure duration, aperture length, light meter reading, flash status, lens focal length, auto focus distance, frame number, and a combination thereof.

13. In an image capturing system, a method for authenticating a captured image, comprising the steps of:
measuring a plurality of parameters associated with said captured image;
watermarking said plurality of parameters into said captured image to generate a watermarked image, and generating a verification key associated with said watermarked parameters;
extracting said plurality of parameters from said watermarked image with said associated verification key; and
comparing said extracted plurality of parameters from said watermarked image with said measured plurality of parameters associated with said captured image, whereby said captured image is authenticated if said extracted parameters match with said measured parameters.

14. The method of claim 13, further comprising the step of recording said measured plurality of parameters associated with each captured image, said extracted parameters being compared with said recorded parameters to authenticate said captured image.

15. The method of claim 14, further comprising the step of specifying which of said measured plurality of parameters is to be watermarked into a corresponding captured image.

16. The method of claim 14, further including the step of transmitting said watermarked image and said associated verification key to a remote system, and said extracting step and said comparing step are performed in said remote system.

17. The method of claim 14, further comprising the step of compressing said captured image prior to said watermarking step, whereby said measured parameters are watermarked into said compressed image.

18. A method for verifying the authenticity of a captured image, said captured image being generated by an image capturing system having means for measuring a plurality of parameters associated with said captured image and means for watermarking said plurality of parameters within said captured image, said method comprising the steps of:
specifying at least one of said plurality of parameters to be measured and watermarked by said image capturing system;
capturing an image of a desired object with said image capturing system;
watermarking said captured image of said object with said specified parameters;
generating a corresponding verification key based on said watermarked parameters;

storing said watermarked image and said corresponding verification key;

retrieving said watermarked image and said corresponding verification key;

extracting from said watermarked image said watermarked parameters using said verification key;

comparing said extracted parameters with said specified parameters to determine if said extracted parameters match said specified parameters.

19. The method of claim 18, further comprising the step of recording said specified parameters, wherein said recorded parameters are compared with said extracted parameters.

20. The method of claim 19, wherein said step of recording said specified parameters includes one of electronically recording said specified parameters with said captured image and manually recording said specified parameters associated with said captured image.

21. The method of claim 13, wherein the step of measuring a plurality of parameters associated with said captured image comprises receiving and recording object data from an object in an observed image frame when the image is generated, said object data comprising object identification information.

22. The method of claim 18, wherein said plurality of parameters to be measured and watermarked comprises user data that is automatically transmitted from a user and recorded when said image is captured, said user data comprising user identification information.

* * * * *